United States Patent [19]

Deex et al.

[11] 4,127,557

[45] Nov. 28, 1978

[54] REINFORCED POLYARYLENE ESTERS

[75] Inventors: Oliver D. Deex, Clayton, Mo.; Virgil W. Weiss, Pensacola, Fla.

[73] Assignee: Monsanto Company, St. Louis, Mo.

[21] Appl. No.: 806,388

[22] Filed: Jun. 13, 1977

Related U.S. Application Data

[63] Continuation-in-part of Ser. No. 709,469, Jul. 28, 1976, which is a continuation-in-part of Ser. No. 654,127, Feb. 2, 1976, abandoned, and Ser. No. 654,128, Feb. 2, 1976, abandoned.

[51] Int. Cl.$^2$ .................. C08G 63/18; C08L 67/02
[52] U.S. Cl. ...................... 260/40 R; 260/40 P; 528/190; 528/193
[58] Field of Search .............. 260/47 C, 40 R, 40 P, 260/49

[56] References Cited

U.S. PATENT DOCUMENTS

| 3,028,364 | 4/1962 | Conix et al. | 260/47 |
|---|---|---|---|
| 3,160,602 | 12/1964 | Kantor et al. | 260/47 |
| 3,161,710 | 12/1964 | Turner | 264/216 |

*Primary Examiner*—Lester L. Lee
*Attorney, Agent, or Firm*—R. Bruce Blance; William J. Farrington; James C. Logomasini

[57] ABSTRACT

Molding resins comprising an intimate blend of a polyarylene ester of 1,2-bis(4-hydroxyphenyl)ethane and a reinforcing amount of a reinforcing filler. The molding resins provide molded polyester articles possessing improved fire safety performance, higher heat distortion temperature and resistance to flow at elevated temperatures.

36 Claims, No Drawings

4,127,557

REINFORCED POLYARYLENE ESTERS

This application is a continuation-in-part of application Ser. No. 709,469, filed July 28, 1976 which is a continuation-in-part of application Ser. No. 654,127 and Ser. No. 654,128, filed Feb. 2, 1976 and now abandoned.

This invention relates to a molding resin, to a method of producing the molding resin and to shaped articles formed from the molding resin. More particularly, it pertains to molding resins comprising a polyarylene ester containing recurring units derived from 1,2-bis(4-hydroxyphenyl)ethane and a reinforcing filler, to a method of producing such molding resins and to shaped articles formed from such molding resins.

DESCRIPTION OF THE PRIOR ART

Many polyesters have been suggested for use as molding resins and engineering thermoplastics since the earliest practical development of such polymers by Whinfield and Dickson. Although several of such polyesters and copolyesters have found commercial success as film and fiber products, few have been successful as molding resins and engineering thermoplastics. Two of the more successful, polyethylene terephthalate and polytetramethylene terephthalate prepared from aliphatic diols and terephthalic acid, suffer from certain deficiencies as engineering thermoplastics. They are both quite flammable and have rather low glass transition temperatures which can limit their usefulness to relatively low temperatures.

Recently polyarylene esters from bis(hydroxyphenyl)ethane have been developed and have been found to give superior fire safety performance and to be capable of yielding crystalline compositions which have superior solvent resistance and stress cracking resistance.

SUMMARY OF THE INVENTION

It has now been discovered that improved molding resins are provided by the intimate blending of reinforcing fillers with these polyarylene esters. The improved molding resins have been found to yield molded articles possessing improved fire safety performance, particularly reduced afterglow, improved resistance to heat distortion and improved resistance to flow at elevated temperatures in comparison with reinforced polyalkylene terephthalates. The molding resins of the present invention comprise an intimate blend of a polyarylene ester and a reinforcing amount of a reinforcing filler, preferably from about 2 to about 60 weight percent of the total composition of a reinforcing filler, wherein the polyarylene ester consists essentially of units derived from at least one $C_8$ to $C_{25}$ aromatic dicarboxylic acid and a diphenol comprising from about 60 to 100 mol percent 1,2-(4-hydroxyphenyl)ethane and from about 40 to 0 mol percent of at least one $C_6$ to $C_{25}$ diphenol.

Another aspect of the invention is directed to a process of manufacture of molding resin by intimately blending these polyarylene esters with a reinforcing filler and yet another aspect is directed to shaped articles molded from these molding resins.

THE PREFERRED EMBODIMENTS

The polyarylene ester component of the molding resin of the present invention is the condensation product of at least one $C_8$ to $C_{25}$ aromatic dicarboxylic acid and a diphenol comprising from about 60 to 100 mol percent 1,2-bis(4-hydroxyphenyl)ethane and from about 40 to 0 mol percent of at least one $C_6$ to $C_{25}$ diphenol. The polyesters are described in copending application Ser. No. 709,469, filed July 28, 1976, the contents of which are incorporated herein by reference and have been found to possess superior fire safety performance.

While essentially any suitable $C_8$ to $C_{25}$ aromatic dicarboxylic acid and admixture thereof can be used in the preparation of the polyarylene esters, the preferred aromatic dicarboxylic acids comprise at least one acid selected from the group consisting of isophthalic acid, terephthalic acid, 3,3'-, 3,4'- and 4,4'-bibenzoic acids and bis(carboxyphenyl)ethers, bis(carboxyphenyl) sulfides, bis(carboxyphenyl(sulfones, bis(carboxyphenyl)methanes, 1,2-bis(carboxyphenyl)ethanes and 2,2-bis(carboxyphenyl)propanes in which the carboxy groups are in the 3 or 4 positions. A particularly preferred aromatic dicarboxylic acid is isophthalic acid and mixtures thereof. Mixtures of one or more of the aromatic dicarboxylic diacids with minor quantities, generally less than about 25 mol percent, of $C_2$ to $C_{20}$ aliphatic diacids can also be used. The quantities of aliphatic diacids in general are selected so that they do not cause a significant loss in Tg of the resulting polyesters. Preferably the quantity is limited to a loss in Tg of not more than 10° C. The acid or admixture of acids is combined with 1,2-bis(-hydroxyphenyl)ethane or with 1,2-bis(4-hydroxyphenyl)ethane in admixture with essentially any other suitable diphenol or mixture of diphenols to provide the aromatic polyesters of the present invention. The preferred diphenols comprise at least one diphenol selected from the group consisting of resorcinol, hydroquinone, 3,3'-, 3,4'- and 4,4'- diphenols, and diphenols repesented by the formula:

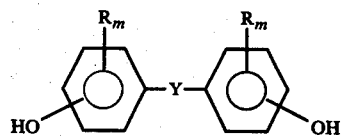

wherein the hydroxyl groups are in the 3- or 4-positions, Y is O, S, $SO_2$, C=O, $CH_2CH(CH_3)$, $C(CH_3)_2$, $(CH_2)_2$ or $(CH_2)_3$ and R is H or a $C_1$ to $C_4$ alkyl radical. The preferred diphenols include resorcinol, hydroquinone, bis(4-hydroxyphenyl)methane, 1,2-bis(3-hydroxyphenyl)ethane, 1-(3-hydroxyphenyl)-2-(4-hydroxyphenyl) ethane, 2,2-bis(4-hydroxyphenyl)propane, bis(4-hydroxyphenyl) ether, bis(4-hydroxyphenyl)sulfide and bis(4-hydroxyphenyl) sulfone.

While the diphenol may contain at least 60 mol percent 1,2-bis(4-hydroxyphenyl)ethane, it is preferred to use a diphenol which comprises at least about 90 mol percent 1,2 -bis(4-hydroxyphneyl)ethane because these polyesters are generally crystalline and exhibit a rather rapid rate of crystallization and polyarylene esters in which 1,2-bis(4-hydroxyphenyl(ethane is substantially the only diphenolic component can be used to advantage to obtain more rapid rates of crystallization.

The inherent viscosity of the polyesters determined at 30° C. and in a solvent combination of 60 parts by weight phenol and 40 parts by weight sym-tetrachloroethane at a concentration of 0.5 g per dl., is at least about 0.5 and is preferably at least about 0.7. The selection of acid and diphenol components is made so that the polyester preferably has a glass transition temperature of at least 100° C. and a melt viscosity at 350° C. determined in a capillary rheometer at a shear rate of 100 sec$^{-1}$ of less than $10^5$ poise. More preferably the selection is made so that the polyester has a melt viscosity in the range of about $10^2$ to $10^5$ poise in the temperature range of 200 to 320° C. For crystalline polyesters prepared by condensation of aromatic diacid and diphenol comprising at least about 90 mol percent 1,2-bis(4-hydroxyphenyl(ethane, the aromatic dicarboxylic acid is preferably selected so that the melting point of the polyarylene ester is less than about 350° C. An especially preferred group of polyarylene esters comprises those polyesters obtained by condensation of a diphenol comprising at least 90 mol percent 1,2-bis(4-hydroxyphenyl)ethane and a dicarboxylic acid comprising at least 67 mol percent isophthalic acid. Of this preferred group, one of the more preferred combinations is obtained from 1,2-bis(4-hydroxyphenyl(ethane and isophthalic acid without additional components. The preferences are based on the availability and cost of the acid as well as on the desirable glass transition and melting points of the resulting polyesters.

Since molding cycles are preferably rapid, it is desirable that a crystalline polyester crystallize in the short period during which the polymer is cooling in the mold. Thus a molding material for uses where high temperature dimensional stability is important, needs to have a rapid rate of crystallization. The glass transition temperature, the melting point and the rate of crystallization can be determined by means of differential scanning calorimetry as described in copending application Ser. No. 709,469, filed July 28, 1976, which is hereby incorporated by reference.

The crystallization rate is expressed as the inverse of the time required for one half of the crystallization exotherm observed when a sample is cooled at a rate of 20° C. per minute. A rate of crystallization of about 0.2 minutes$^{-1}$ or greater as determined by this method is satisfactory in injection molding of polymers because the cooling rate in the molding operation is generally much faster than the cooling rate used in the determination of rate of crystallization. However, a crystallization rate of about 0.5 minutes$^{-1}$ or greater is more preferable and for rapid molding cycles a crystallization rate of about one minute$^{-1}$ or greater is even more preferred.

The polyarylene ester component of the present invention can be produced by an convenient method such as by melt condensation or solvent condensation of mixtures of aromatic dicarboxylic acids and diphenol diesters selected to provide polyarylene esters of the desired fire safety performance and processability. They can be produced by melt or solution polymerization of selected mixtures of phenol esters of aromatic dicarboxylic acids and diphenols and by interfacial polymerization of salts of diphenols and aromatic dicarboxylic acid dihalides. Thus, while the combination is formally a condensate of diacid and diphenol, in practice the reactants are diacids and diphenol esters, or phenyl esters of diacids and diphenols, or salts of diphenols and diacid halides. A preferred method of preparation is the melt condensation of mixtures of aromatic dicarboxylic acids and diphenol diesters. Another preferred method is the melt condensation of mixtures of aromatic dicarboxylic acids and diphenol diesters to a prepolymer stage of inherent viscosity in the range of about 0.1 to 0.4 followed by solid state polymerization to advance the polymer to an inherent viscosity above about 0.5.

The molding resins of the present invention are prepared by intimately blending the polyarylene ester with a reinforcing amount of a reinforcing filler which is generally from about 2 to about 60 weight percent of the total composition. Preferably, the amount of reinforcing filler is in the range of from about 5 to about 40 weight percent of the total composition to achieve a sufficient degree of reinforcement without an excessive increase in melt viscosity. It is to be understood that the indicia of reinforcement are increases in the tensile strength, stiffness or impact strength of the filled composition in comparison with the unfilled composition.

In general, any reinforcement can be used such as granular, plate-like, acicular or fibrous fillers of suitable size for reinforcement. The fillers may be metallic such as aluminum, iron, nickel, copper, or zinc or may be non-metallic such as carbon filaments, silicates, clays, calcined clays, asbestos, silica, titanium dioxide, titanate whiskers, glass flakes and fibers and the like.

The preferred reinforcing fillers include any kind of glass fibers usually used for reinforcing thermoplastic resins. It is preferred to use relatively soda free glasses comprising lime-aluminum borosilicate glass such as types "C" and "E" glass. The fibers may be in the form of filaments, or bundled into strands, ropes or rovings and the like. They are conveniently used in the form of chopped strands of up to about 2 inches in length and preferably in the range of about ⅛ to about 1 inch in length. Other additives such as colorants, plasticizers, stabilizers, hardeners and the like can be incorporated into the molding resins.

Blending of the polyarylene ester and the reinforcing filler is carried out in any convenient way, such as by dry mixing pellets or powder of polyarylene ester with the filler and melt blending and extrusion, or by adding filler to molten polyarylene ester, blending and extrusion. The polyarylene ester, the reinforcing filler and any other additives are preferably as free as possible of water. Mixing is preferably carried out in as short a time as possible to provide a sufficiently intimate and uniform blend and at a temperature selected for adequate melt viscosity but insufficient to cause thermal degradation of the resin. The blend can be extruded and cut up into molding compounds such as granules, pellets, etc. by conventional techniques.

The molding resins can be molded in any equipment conveniently used for reinforced thermoplastic compositions e.g., a ½ oz. Arburg machine with temperature in the range of about 250 to about 350° C. and mold temperature about 100 to 150° C. can be used. Depending on the molding properties of the polyarylene ester, the amount of reinforcing filler and the crystallization behavior of the polyarylene ester, those skilled in the art will be able to make the conventional adjustments in molding cycles to accommodate the composition.

The invention is further illustrated but is not intended to be limited by the following examples in which ratios of monomers are mol ratios and all other parts and percentages are by weight unless specified otherwise.

PREPARATION OF POLYARYLENE ESTERS OF 1,2-BIS(4-HYDROXYPHENYL)ETHANE

EXAMPLE A

POLY(1,2-BIS(4-HYDROXYPHENYL)ETHANE ISOPHTHALATE

A charge consisting of 8.2 parts of isophthalic acid and 14.8 parts of 1,2-bis(4-acetoxyphenyl)ethane is placed in a reaction vessel equipped with a stirrer, condenser and receiver. The vessel is evacuated and purged with nitrogen three times. A nitrogen blanket is maintained in the reactor while it is heated to 250° C. for about three hours during which period approximately 3.5 to 4.0 parts of acetic acid distills. Thereupon the vessel is evacuated to a pressure of about 125 mm. and heating at 275° C. is continued for one half hour during which period an additional 1 to 1.5 parts of acetic acid distills. The vacuum is then increased to reduce the pressure to about 0.1 to 0.2 mm. and the temperature is raised to 290° C. for an additional hour. At this point the reaction mixture becomes so viscous that further stirring is difficult. Heating is stopped, the reaction mixture is again blanketed with nitrogen and allowed to cool. The resultant polymer is light yellow in color, crystalline and demonstrates an inherent viscosity of 0.57 in the phenol-tetrachloroethane solvent.

EXAMPLE B

POLY(1,2-BIS(4-HYDROXYPHENYL)ETHANE ISOPHTHALATE

A similar reaction is carried out under the same conditions and with the reactants and equipment described in Example A except that after the initial three hour period the temperature is raised to 275° C. and the pressure is reduced to 125 mm. for 30 minutes. Thereafter, the temperature is raised to 290° C. during the final period at high vacuum of 0.1 to 0.2 mm. The resultant polymer demonstrates an inherent viscosity of 0.83 and is crystalline and a clear light yellow in color.

EXAMPLES C – U

Examples C to U are carried out by reacting mixtures of diphenol diacetates and isophthalic acid by the melt method of Example A, with adjustment in the temperature and heating cycle appropriate for the rheology and morphology of the particular polyester or by melt polymerization to a prepolymer followed by solid state polymerization of the crystalline polyester. Compositions and physical property data are set forth in Table 1. Melt viscosities are determined at 316° C. with a Sieglaff-McKelvey Rheometer at a shear rate of 100 sec.$^{-1}$, using a capillary with a length to diameter ratio of 25 to 1.

The data show that polyester combinations containing high levels of 1,2-bis(hydroxyphenyl)ethane and acids such as isophthalic acid are opaque and exhibit crystalline melting points below 300° C. and crystalline rapidly while in contrast, polyester combinations containing substantial amounts of other diphenols and polyester combinations containing substantial amounts of substituted acids such as 5-t-butyl-isophthalic acid are amorphous.

Fire safety performance is conveniently determined by the Underwriter's Laboratory "Test for Flammability of Plastic Materials — UL-94, Sept. 17, 1973" using the ratings which became effective Feb. 1, 1974. The polyesters of 1,2-bis(4-hydroxyphenyl)ethane are found to be superior in their UL-94 rating to polyesters containing a substantial amount of bisphenol A (2,2-bis(4-hydroxyphenyl)propane.

TABLE 1
POLYARYLENE ESTERS OF 1, 2-BIS(4-HYDROXYPHENYL)ETHANE

| Example | Composition Diphenol Mol Ratio | Diacid Mol Ratio | Appearance | Inherent Viscosity | Tg °C. | Tm °C. | Rate of Crys. Min$^{-1}$ | Melt Viscosity | UL-94 Rating Thickness 0.79 mm. |
|---|---|---|---|---|---|---|---|---|---|
| C | 100 BHPE | 100 I | Opaque | 0.96 | 140 | — | — | — | V-0 to V-1 |
| D | 100 BHPE | 100 I | Opaque | 0.94 | — | — | — | 1.8 × 10$^4$ | — |
| E | 100 BHPE | 100 I | Opaque | 0.62 | — | — | — | 1.8 × 10$^3$ | — |
| F | 100 BHPE | 100 I | Opaque | 0.5 | — | — | — | — | V-1 |
| G | 100 BHPE | 100 I | Opaque | 1.01 | 154 | 289 | — | — | — |
| H | 100 BHPE | 97 I/3 A | Opaque | 0.72 | — | — | — | — | V-0 tp V-1 |
| I | 100 BHPE | 90 I,10 T | Opaque | 0.88 | 154 | 255 | 0.72 | — | — |
| J | 100 BHPE | 93 I, 7 N | Opaque | 0.86 | — | — | 0.99 | — | — |
| K | 100 BHPE | 90 I,10 O | Opaque | 0.93 | — | — | 2.56 | — | — |
| L | 100 BHPE | 67 I,33 N | Opaque | — | — | — | — | — | — |
| M | 100 BHPE | 85 I,15 BI | Opaque | 0.86 | 150 | — | — | — | V-0 |
| N | 100 BHPE | 80 I,20 BI | Opaque | 0.77 | 150 | 262 | — | — | V-0 |
| O | 100 BHPE | 75 I,25 BI | Transparent, amorphous | 1.02 | — | — | — | — | V-0 |
| P | 100 BHPE | 75 I,25 BI | Transparent, amorphus, heat crystallizable | 0.82 | 150 | 257 | — | — | — |
| Q | 90 BHPE, 10 BHPE | 100 I | Opaque | 1.10 | — | — | 2.11 | — | — |
| R | 90 BHPE, 10 BPA | 100 I | Opaque | 0.94 | — | — | — | 1.15 × 10$^4$ | V-0 to V-1 |
| S | 75 BHPE, 25 BPA | 100 I | Transparent, amorphous | 0.53 | — | — | — | 2.3 × 10$^4$ | V-1 |
| T | 50 BHPE, 50 BPA | 100 I | Transparent, amorphous | 0.50 | — | — | — | 9.5 × 10$^2$ | Fails |
| U | 100 BPA | 100 I | Transparent, amorphous | 0.62 | 180 | None | 0 | — | — |

BHPE - 1,2-bis(4-hydroxyphenyl)ethane
BPA - 2,2-bis(4-hydroxyphenyl)propane (bisphenol A)
BHPS - bis(4-hydroxyphenyl)sulfide
A - Azelaic acid
I - isophthalic acid
T - terephthalic acid
N - 2,6-naphthalene dicarboxylic acid
O - oxydibenzoic acid, [bis(4-carboxypheny)ether]
BI - 5-t-butyl-isophtalic acid

PREPARATION OF MOLDING RESINS

EXAMPLE 1

Polyisophthalate of 1,2-bis(4-hydroxyphenyl)ethane prepared as in Example C, is extruded and chopped to yield pellets of approximately 3 to 5 mm in length and 2 mm in diameter. 85 Parts by weight of the pellets are blended in a tumble blender with 15 parts by weight of chopped glass strand, 4.8 mm length, containing 800 filaments of .13 micron diameter per strand supplied by Owens Corning Fiberglas Corporation under the tradename Owens-Corning Fiberglas 419. The blend of polyester and glass fiber is force fed to the chopper of a single stage extruder heated to 320° C. and is slowly extruded through the strand die. The strand is cooled and chopped to provide pellets of molding resin.

The molding resin is injection molded in a half-ounce Arbug machine at a temperature of 315° C. and a mold temperature of 122° C. to provide test bars. The test bars are tested for tensile strength and elongation, ASTM D-638; flexural strength and modulus, ASTM D-790; impact strength ASTM D-256; heat distortion D-648. The data are presented in Table 2.

EXAMPLES 2 and 3

Molding resins are prepared as in Example 1 with the polyisophthalate of 1,2-bis(4-hydroxyphenyl)ethane and respectively 22.5 and 30 parts by weight of glass fiber per 100 parts by weight of total composition. The molding resins are injection molded into test bars and subjected to physical testing. The data are presented in Table 2.

TABLE 2

PHYSICAL PROPERTIES OF ARTICLES MOLDED FROM THE POLYISOPHTHALATE OF 1,2-BIS(4-HYDROXYPHENYL)ETHANE

| | Examples | | | |
|---|---|---|---|---|
| | 1 | 2 | 3 | 4 |
| Wt. % Glass Fiber | 15 | 22.5 | 30 | None |
| Tensile Strength, Kg cm$^{-2}$ × 10$^{-2}$ | 10.5 | 12 | 12.7 | 6.3 |
| Elongation % | 4.4 | 3.1 | 1.8 | 18 |
| Modulus Kg. cm$^{-2}$ × 10$^{-4}$ | | | | |
| Izod (64 cm × 1.3 cm × 0.64 cm) Kg m | 0.18 | 0.24 | 0.26 | 0.25 |
| HDTUL, ° C. (16.4 cm × 1.3 cm × 0.64 cm; 18.6 Kg cm$^{-2}$) | 158 | 183 | 204 | 137 |

Example 2 is subjected to the Underwriter's UL-94 test. The rating for samples 1.58 mm in thickness is V-O (average flame out time within 5 seconds, no afterglow). In comparison, the polyester of Example 2 without glass fiber reinforcement is rated V-O (average flame out time within 3 seconds with afterglow). A test bar of Example 2 with a heat distortion temperature of 183° C. was subjected to a load in the range of 0.14 to 0.28 kg cm$^{-2}$ for 20 minutes at 210° C. No flow or deformation occurs. In contrast, a test bar of a reinforced polytetramethylene terephthalate, containing 30 weight percent glass fiber, having a heat distortion temperature of 212° C, shows considerable flow and deformation under similar conditions and fails the UL-94 test.

EXAMPLES 5-10

Molding resins are prepared as in Example 1 by blending polyarylene ester Examples K, L, M, N, P and R with 30 weight percent of the total composition of Owens-Corning Fiberglas 419. The molding resins are molded into test bars. Considerable enhancement of the tensile strength, modulus and heat distortion temperature is obtained in comparison with the unfilled polyesters.

EXAMPLES 11-14

These examples are prepared for comparative purposes. A polyarylene ester similar to Example U comprising the condensation product of bisphenol A and isophthalic acid, of inherent viscosity 0.8 is blended with glass fiber in the manner described in Example 1. The molding resins thus obtained are molded into test bars and tested for physical properties. Examples 11, 12 and 13 contain 15, 22.5 and 30 weight percent of glass fiber; Example 14 is the unreinforced polyester. The data are presented in Table 3 and show that the heat distortion temperature of this polyester is relatively unaffected by the reinforcing filler in contrast to the pronounced effect obtained in Examples 1-3 comprising the polyisophthalate of 1,2-bis(4-hydroxyphenyl)ethane.

TABLE 3

PHYSICAL PROPERTIES OF ARTICLES MOLDED FROM THE POLYISOPHTHALATE OF 2,2-BIS(4-HYDROXYPHENYL)PROPANE

| | Examples | | | |
|---|---|---|---|---|
| | 11, | 12, | 13, | 14, |
| Wt. % Glass Fiber | 15 | 22.5 | 30 | None |
| Tensile Strength kg cm$^{-2}$ × 10$^{-2}$ | 9.3 | 11.2 | 12.5 | 7.7 |
| Elongation % | 5.6 | 3.9 | 3.8 | 4.0 |
| Modulus kg cm$^{-2}$ × 10$^{-4}$ | 4.0 | 5.8 | 6.7 | 2.24 |
| HDTUL, ° C. 18.6 kg cm$^{-2}$ | 175 | 173 | 177 | 160 |

EXAMPLES 15-17

Molding resins containing 30 weight percent glass fiber are prepared in the manner of Example 1 from polyester Examples S and T. The molding resins are molded into test bars. The tensile strength and modulus of the polyesters are enhanced by the addition of glass fiber. However, little improvement in heat distortion temperature is obtained.

What is claimed is:

1. A molding resin comprising an intimate blend of a polyarylene ester and a reinforcing amount of a reinforcing filler, wherein the polyarylene ester consists essentially of the condensation product of at least one $C_8$ to $C_{25}$ aromatic dicarboxylic acid and a diphenol comprising from about 60 to 100 mol percent 1,2-bis-(4- hydroxyphenyl)ethane and from about 40 to 0 mol percent of at least one C₆ to C₂₅ diphenol and wherein the inherent viscosity of the polyarylene ester at 30° C. determined at a concentration of 0.5 grams polyester per 100 ml solution in a solvent mixture of 60 parts by weight of phenol and 40 parts by weight of symtetrachloroethane is at least about 0.5, and the melt viscosity of the polyarylene ester at 320° C. determined at a shear rate of 100 sec$^{-1}$ with a capillary rheometer is less than about 10⁵ poises.

2. The molding resin of claim 1 wherein the reinforcing filler is a granular, plate-like, acicular or fibrous filler and comprises from about 2 to about 60 weight percent of the molding resin.

3. The molding resin of claim 2 wherein the reinforcing filler is a fibrous non-metallic filler.

4. The molding resin of claim 2 wherein the reinforcing filler is glass fiber.

5. The molding resin of claim 2 wherein the aromatic dicarboxylic acid comprises at least one acid selected from the group consisting of isophthalic acid, terephthalic acid, t-butylisophthalic acid, 3,3'-3,4'- and 4,4'-bibenzoic acids and bis-(carboxyphenyl)ethers, bis(carboxyphenyl)sulfides, bis(carboxyphenyl)sulfones, bis(-carboxyphenyl)methanes, 1,2-bis(carboxyphenyl) ethanes, and 2,2-bis(carboxyphenyl)propanes, wherein the carboxy groups are in the 3- or 4-positions.

6. The molding resin of claim 2 wherein the C₆ to C₂₅ diphenol comprises at least one diphenol selected from the group consisting of resorcinol, hydroquinone, 3,3'-, 3,4'- and 4,4'-diphenols and diphenols represented by the formula

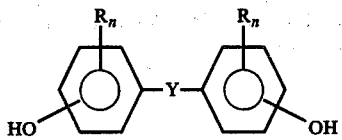

wherein the hydroxyl groups are in the 3- or 4- positions, Y is O, S, SO₂, C=O, CH₂, CH(CH₃), C(CH₃)₂(CH₂)₂or (CH₂)₃, and R is H or a C₁ to C₄ alkyl radical and $n = 0$ to 4.

7. The molding resin of claim 2 wherein the C₆ to C₂₅ diphenol comprises at least one diphenol selected from the group consisting of hydroquinone, resorcinol, bis(4-hydroxyphenyl) methane, 1,2-bis(3-hydroxyphenyl)ethane, 1-(3-hydroxyphenyl)-2-(4-hydroxyphenyl)ethane, 2,2-bis(4-hydroxyphenyl)propane, bis(4-hydroxyphenyl)ether, bis(4-hydroxyphenyl)sulfide and bis(4-hydroxyphenyl)sulfone.

8. The molding resin of claim 2 wherein the diphenol comprises from about 90 to 100 mol percent 1,2-bis(4-hydroxyphenyl)ethane and from about 10 to 0 mol percent of at least one C₆ to C₂₅ diphenol.

9. The molding resin of claim 2 wherein the inherent viscosity of the polyester is at least about 0.7.

10. A molding resin comprising an intimate blend of a crystalline polyarylene ester and from about 2 to about 60 weight percent of the total composition of a reinforcing filler, wherein the polyarylene ester consists essentially of the condensation product of at least one aromatic dicarboxylic acid selected from the group consisting of isophthalic acid, terephthalic acid, t-butylisophthalic acid, bis(4-carboxyphenyl)ether, bis(4-carboxyphenyl)sulfide, bis(4-carboxyphenyl)sulfone, bis(4-carboxyphenyl)methane, 1,2-bis(4-carboxyphenyl)ethane, 2,2-bis(4-carboxyphenyl)propane, 3,3'-, 3,4'- and 4,4'-bibenzoic acids, and a diphenol comprising from about 90 to 100 mol percent 1,2-bis(4-hydroxyphenyl)ethane and from about 10 to 0 mol percent of at least one C₆ to C₂₅ diphenol and wherein the inherent viscosity of the polyarylene ester at 30° C. determined at a concentration of 0.5 grams polyester per 100 ml solution in a solvent mixture of 60 parts by weight of phenol and 40 parts by weight of symtetrachloroethane is at least about 0.5, and the melting point of the polyarylene ester is less than about 350° C.

11. The molding resin of claim 10 wherein the reinforcing filler is a granular, plate-like, acicular or fibrous filler.

12. The molding resin of claim 10 wherein the reinforcing filler is a fibrous non-metallic filler.

13. The molding resin of claim 10 wherein the reinforcing filler is glass fiber.

14. The molding resin of claim 10 wherein the C₆ to C₂₅ diphenol comprises at least one diphenol selected from the group consisting of hydroquinone, resorcinol, bis(4-hydroxyphenyl) methane, 1,2-bis(3-hydroxyphenyl)ethane, 1-(3-hydroxyphenyl)-2-(4-hydroxyphenyl)ethane, 2,2-bis(4-hydroxyphenyl)propane, bis-(4-hydroxyphenyl)ether, bis(4-hydroxyphenyl)sulfide and bis(4-hydroxyphenyl)sulfone, and wherein the inherent viscosity of the polyarylene ester is at least about 0.7.

15. The molding resin of claim 10 wherein the polyarylene ester has a crystallization rate of at least about 0.2 min$^{-1}$.

16. The molding resin of claim 10 wherein the polyarylene ester has a crystallization rate of at least about 0.5 min$^{-1}$.

17. A molding resin comprising an intimate blend of a crystalline polyarylene ester and from about 2 to about 60 weight percent of the total composition of a reinforcing filler wherein the polyarylene ester consists essentially of the condensation product of an aromatic dicarboxylic acid comprising at least about 67 mol percent of isophthalic acid and a diphenol comprising at least about 90 mol percent of 1,2-bis(4-hydroxyphenyl)ethane and wherein the inherent viscosity of the polyarylene ester at 30° C. determined at a concentration of 0.5 grams polyester per 100 ml solution in a solvent mixture of 60 parts by weight of phenol and 40 parts by weight of sym-tetrachloroethane is at least about 0.7, and the melting point of the polyarylene ester is less than about 350° C.

18. The molding resin of claim 17 wherein the reinforcing filler is a granular, plate-like, acicular or fibrous filler.

19. The molding resin of claim 17 wherein the reinforcing filler is a fibrous non-metallic filler.

20. The molding resin of claim 17 wherein the reinforcing filler is glass fiber.

21. The molding resin of claim 17 wherein the polyarylene ester has a crystallization rate of at least about 0.2 min$^{-1}$.

22. The molding resin of claim 17 wherein the polyarylene ester has a crystallization rate of at least about 0.5 min$^{-1}$.

23. A molding resin comprising an intimate blend of a polyarylene ester and from about 2 to 60 weight percent of the total composition of a reinforcing filler, wherein the polyarylene ester consists essentially of recurring units represented by the formula $$-\underset{O}{\overset{C}{\underset{\|}{C}}}-\bigcirc-\underset{O}{\overset{\|}{C}}-O-\bigcirc-CH_2CH_2-\bigcirc-O-$$

and has an inherent viscosity at 30° C. determined at a concentration of 0.5 grams polyester per 100 ml solution in a solvent mixture of 60 parts by weight of phenol and 40 parts by weight of sym-tetrachloroethane of at least about 0.5.

24. The molding resin of claim 23 wherein the reinforcing filler is a granular, plate-like, acicular or fibrous filler.

25. The molding resin of claim 23 wherein the reinforcing filler is a fibrous non-metallic filler.

26. The molding resin of claim 23 wherein the reinforcing filler is glass fiber.

27. A molded article formed from the molding resin of claim 1.

28. A molded article formed from the molding resin of claim 10.

29. A molded article formed from the molding resin of claim 17.

30. A molded article formed from the molding resin of claim 23.

31. A method of producing a molding resin comprising intimately blending a melt of a polyarylene ester with from about 2 to about 60 weight percent of the total composition of a reinforcing filler, wherein the polyarylene ester is a condensation product of at least one $C_8$ to $C_{25}$ aromatic dicarboxylic acid and a diphenol comprising from about 60 to 100 mol percent 1,2-bis-(4-hydroxyphenyl)ethane and from about 40 to 0 mol percent of at least one $C_6$ to $C_{25}$ diphenol and wherein the inherent viscosity of the polyarylene ester at 30° C. determined at a concentration of 0.5 grams polyester per 100 ml solution in a solvent mixture of 60 parts by weight of phenol and 40 parts by weight of symtetrachloroethane is at least about 0.5, and the melt viscosity of the polyarylene ester at 320° C. determined at a shear rate of 100 sec$^{-1}$ with a capillary rheometer is less than about $10^5$ poise.

32. A method of producing a molding resin comprising intimately blending a melt of a polyarylene ester with from about 2 to about 60 weight percent of the total composition of a reinforcing filler, wherein the polyarylene ester is a condensation product of at least one $C_8$ to $C_{25}$ aromatic dicarboxylic acid and a diphenol comprising from about 90 to about 100 mol percent 1,2-bis-(4-hydroxyphenyl)ethane and from about 10 to 0 mol percent of at least one $C_6$ to $C_{25}$ diphenol and wherein the inherent viscosity of the polyarylene ester at 30° C. determined at a concentration of 0.5 gram polyester per 100 ml solution in a solvent mixture of 60 parts by weight of phenol and 40 parts by weight of symtetrachloroethane is at least about 0.7 and the melting point of the polyarylene ester is less than about 350° C.

33. The method of claim 32 wherein the aromatic dicarboxylic acid comprises at least about 67 mol percent isophthalic acid.

34. The method of claim 32 wherein the reinforcing filler is a granular, plate-like, acicular or fibrous filler.

35. The method of claim 32 wherein the reinforcing filler is a fibrous non-metallic filler.

36. The method of claim 32 wherein the reinforcing filler is glass fiber.

* * * * *

UNITED STATES PATENT OFFICE
CERTIFICATE OF CORRECTION

PATENT NO. : 4,127,557
DATED : November 28, 1978
INVENTOR(S) : Oliver D. Deex and Virgil W. Weiss It is certified that error appears in the above-identified patent and that said Letters Patent are hereby corrected as shown below:

At column 2, line 43, after "$CH_2$", insert a comma (,).

At column 2, line 15, "bis(carboxyphenyl(sulfones" should read: --- bis(carboxyphenyl)sulfones ---.

At column 2, line 59 and column 3, line 9, "1,2-bis(4-hydroxyphenyl(ethane" should read: --- 1,2-bis(4-hydroxyphenyl)ethane ---.

At column 7, Table 2, line 9 for "Modulus Kg $cm^{-2}$ X $10^{-4}$, add, --- 5.3--- for Example 1; --- 7.0 --- for Example 2; --- 8.4 --- for Example 3 and --- 2.3 --- for Example 4.

Signed and Sealed this

Twentieth Day of February 1979

[SEAL]

Attest:

RUTH C. MASON
Attesting Officer

DONALD W. BANNER
Commissioner of Patents and Trademarks